(12) United States Patent
Kim et al.

(10) Patent No.: US 11,777,603 B2
(45) Date of Patent: Oct. 3, 2023

(54) HIGH MAGNIFICATION AFOCAL TELESCOPE WITH HIGH INDEX FIELD CURVATURE CORRECTOR

(71) Applicant: X DEVELOPMENT LLC, Mountain View, CA (US)

(72) Inventors: Nam-hyong Kim, San Jose, CA (US); Andrei Kazmierski, Pleasanton, CA (US); Devin Brinkley, Redwood City, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 16/436,278

(22) Filed: Jun. 10, 2019

(65) Prior Publication Data
US 2020/0228202 A1  Jul. 16, 2020

Related U.S. Application Data

(60) Provisional application No. 62/793,135, filed on Jan. 16, 2019.

(51) Int. Cl.
*H04B 10/112* (2013.01)
*H04B 10/116* (2013.01)
(Continued)

(52) U.S. Cl.
CPC ........... *H04B 10/116* (2013.01); *G02B 5/208* (2013.01); *G02B 13/14* (2013.01);
(Continued)

(58) Field of Classification Search
CPC .............................................. H04B 10/11–118
(Continued)

(56) References Cited

U.S. PATENT DOCUMENTS 2,827,835 A * 3/1958 Schade .................. G02B 13/00
359/780
4,411,499 A * 10/1983 Abel .................. G02B 17/0808
359/648
(Continued)

FOREIGN PATENT DOCUMENTS

GB            1451276 A     9/1976
JP         H07168099 A     7/1995
(Continued)

OTHER PUBLICATIONS

Edmund Optics: "The Correct Material for Infrared (IR) Applications", Apr. 2020, https://www.edmundoptics.com/knowledge-center/application-notes/optics/the-correct-material-for-infrared-applications/#comparison (Year: 2020).*

(Continued)

*Primary Examiner* — Li Liu
(74) *Attorney, Agent, or Firm* — Botos Churchill IP Law

(57) ABSTRACT

The disclosure provides for a free-space optical communication system that includes a first lens group, a field corrector lens, and a second lens group. The first lens group is configured to receive light received from a remote free-space optical transmitter. The first lens group has a first focal plane. The field corrector lens is positioned between the first lens group and the first focal plane of the first lens group and positioned closer to the first focal plane than the first lens group. The first lens group also is made of material having an index of refraction of at least 2.0, and has a second focal plane. The second lens group is positioned at the second focal plane of the field corrector lens and is configured to couple light to a sensor.

14 Claims, 4 Drawing Sheets

(51) Int. Cl.
*G02B 27/00* (2006.01)
*H04B 10/40* (2013.01)
*G02B 5/20* (2006.01)
*G02B 13/14* (2006.01)

(52) U.S. Cl.
CPC ....... *G02B 27/0025* (2013.01); *H04B 10/112* (2013.01); *H04B 10/1123* (2013.01); *H04B 10/1125* (2013.01); *H04B 10/40* (2013.01)

(58) Field of Classification Search
USPC .................................................. 398/118–131
See application file for complete search history.

(56) References Cited

U.S. PATENT DOCUMENTS

| | | | | |
|---|---|---|---|---|
| 4,432,596 A * | 2/1984 | Campbell | ............ | G02B 25/001 359/351 |
| 4,543,662 A * | 9/1985 | Huignard | ............ | G02B 6/3534 398/118 |
| 4,854,686 A * | 8/1989 | Oda | ............ | G02B 9/34 359/795 |
| 4,900,139 A * | 2/1990 | Kreitzer | ............ | G02B 13/16 359/649 |
| 5,638,215 A * | 6/1997 | Neil | ............ | G02B 3/12 359/665 |
| 5,973,827 A * | 10/1999 | Chipper | ............ | G02B 5/1809 359/16 |
| 6,118,131 A * | 9/2000 | Korevaar | ............ | H04B 10/1121 250/559.3 |
| 6,384,944 B1 | 5/2002 | Takayama et al. | | |
| 6,456,261 B1 * | 9/2002 | Zhang | ............ | A42B 3/042 345/7 |
| 6,504,634 B1 * | 1/2003 | Chan | ............ | H04B 10/1125 398/129 |
| 7,920,794 B1 * | 4/2011 | Whaley | ............ | H04B 10/1125 398/131 |
| 9,954,613 B1 * | 4/2018 | Goorjian | ............ | H04B 10/1123 |
| 10,225,011 B1 * | 3/2019 | Schubert | ............ | H04B 10/1125 |
| 2004/0213587 A1 * | 10/2004 | Conchas | ............ | H04B 10/1123 398/212 |
| 2006/0008238 A1 * | 1/2006 | Suzuki | ............ | G02B 6/4206 385/147 |
| 2006/0024061 A1 * | 2/2006 | Wirth | ............ | H04B 10/1125 398/129 |
| 2011/0043796 A1 * | 2/2011 | Markwort | ............ | G01N 21/9501 356/237.2 |
| 2014/0240820 A1 | 8/2014 | Sitter | | |
| 2014/0334825 A1 * | 11/2014 | Pandharipande | ... | H04L 12/6418 398/128 |
| 2015/0244458 A1 * | 8/2015 | Erkmen | ............ | H04B 7/18504 398/122 |
| 2017/0111557 A1 * | 4/2017 | Ko | ............ | H04N 5/332 |
| 2018/0019807 A1 * | 1/2018 | Hreha | ............ | H04B 7/18513 |
| 2018/0088280 A1 * | 3/2018 | Kim | ............ | G02B 6/29395 |

FOREIGN PATENT DOCUMENTS

| | | | | |
|---|---|---|---|---|
| JP | 2002023051 A | | 1/2002 | |
| JP | 2013148626 | * | 8/2013 | ............ G02B 13/14 |
| JP | 2013148626 A | | 8/2013 | |

OTHER PUBLICATIONS

Mann: "Infrared zoom lens system for target detection", Optical Engineering, Jul./Aug. 1982, vol. 21, No. 4, pp. 786-793 (Year : 1982).*

International Search Report and Written Opinion for Application No. PCT/US2020/013339 dated May 19, 2020.

Kallo, P., et al., "Applications of afocal optical systems in metrology, instrumentation techniques and information technology", Proceedings of The 1998 1st Conference On Mechanical Engineering, Gepeszet '98; May 28, 1998-May 29, 1998; vol. 2, May 28, 1998, ISBN: 978-963-699-078-7, Springer Hungarica Kiado, HU, Budapest, Hungary., pp. 1-8, XP008178966.

Khalighi, Mohammad Ali, et al., "Survey on Free Space Optical Communication: A Communication Theory Perspective", IEEE Communications Surveys & Tutorials, Oct. 1, 2014, vol. 16, No. 4, DOI: 10.1109/COMST.2014.2329501, retrieved on Nov. 20, 2014, abstract Section VIII. Adaptive Transmission., pp. 1-28, XP011565144.

Mann, Allen , "Infrared zoom lens system for target detection", Optical Engineering, Jul. 1, 1982, URL:https://www.spiedigitallibrary.org/jou rnals/optical-engineering/volume-21/issue-4/214786/Infrared-Zoom-Lens-System-For-Tar get-Detection/10.1117/12.7972977.full, retrieved from internet on 5/8/2., pp. 1-8 XP055693038.

Notice of Reasons for Rejection for Japanese Patent Application No. 2021-532179, dated Oct. 17, 2022.

* cited by examiner

142

330

HIGH MAGNIFICATION AFOCAL TELESCOPE WITH HIGH INDEX FIELD CURVATURE CORRECTOR

CROSS REFERENCE TO RELATED APPLICATIONS

This application claims the benefit of the filing date of U.S. Provisional Patent Application No. 62/793,135 filed Jan. 16, 2019, the disclosure of which is hereby incorporated herein by reference

BACKGROUND

Information can be transmitted over directional point-to-point networks, such as aerospace and other mobile networks. In such networks, links can be formed between pairs of nodes, or terminals at each node, by aiming lens systems of each node pair towards each other. In some implementations, the nodes may transmit and receive optical signals through free space optical communication (FSOC) links.

BRIEF SUMMARY

Aspects of the disclosure provide for a free-space optical communication system. The free-space optical communication system includes a first lens group configured to receive light from a remote free-space optical transmitter, the first lens group having a first focal plane; a field corrector lens positioned between the first lens group and the first focal plane of the first lens group and positioned closer to the first focal plane than the first lens group, the field corrector lens comprising material having an index of refraction of at least 2.0 and having a second focal plane; and a second lens group positioned at the second focal plane of the field corrector lens and configured to couple light to a sensor of the free-space optical communication system.

In one example, the index of refraction is at least 2.7. In another example, the material is silicon. In a further example, the field corrector lens is configured to reduce a cross-sectional area of the light received at the first lens group. In this example, the field corrector lens is configured to reduce the cross-sectional area of the light received at the first lens group by at least a factor of 300 at the second focal plane. In yet another example, the material is opaque for visual light.

In a still further example, the material is transparent for C-band or near-infrared wavelengths. In another example, the system also includes the sensor and one or more processors. The one or more processors in this example are configured to extract data related to an optical signal from the light using the sensor; and operate the free-space optical communication system according to the extracted data. In this example, the extracted data includes network path information for the optical signal; and the one or more processors are configured to operate the free-space optical communication according to the extracted data by transmitting the optical signal to a network based on the extracted data. Also optionally in this example, the extracted data includes characteristics of the optical signal; and the one or more processors are configured to operate the free-space optical communication according to the extracted data by adjusting a transmitted signal over a communication link with a remote communication device associated with the remote free-space optical transmitter.

Other aspects of the disclosure provide for a lens system of an optical communication device. The lens system includes a first lens group configured to receive light from a remote free-space optical transmitter, the first lens group having a first focal plane; a field corrector lens positioned between the first lens group and the first focal plane of the first lens group and positioned closer to the first focal plane than the first lens group, the field corrector lens comprising material that is opaque to visual light and transparent to C-band or near-infrared wavelengths, and having a second focal plane; and a second lens group positioned at the second focal plane of the field corrector lens and configured to couple light to a sensor.

In one example, the field corrector lens has an index of refraction of at least 2.7. In another example, the material is silicon. In a further example, the field corrector lens is configured to reduce a cross-sectional area of the received light received at the first lens group. In this example, the field corrector lens is configured to reduce the cross-sectional area of the light received at the first lens group by at least a factor of 300 at the second focal plane.

Further aspects of the disclosure provide for a method of processing an optical signal. The method includes receiving light at a first lens group of an optical communication device; the first lens group focusing the light onto a field corrector lens of the optical communication device, the field corrector lens being positioned between the first lens group and a first focal plane of the first lens group and positioned closer to the first focal plane than the first lens group; receiving the light at the field corrector lens; the field corrector lens filtering the light received thereat; focusing the light, using the field corrector lens, onto a second lens group of the optical communication device, the second lens group being positioned at a second focal plane of the field corrector lens; emitting the light from the second lens group to a photodetector of the optical communication device; and operating, by one or more processors, the optical communication device according to the light received at the photodetector.

In one example, the field corrector lens is made of silicon. In another example, filtering the light includes removing or reducing visible light frequencies. In a further example, focusing the light using the field corrector lens includes reducing a cross-sectional area of the light received at the first lens group by a factor of at least 300 at the second focal plane. In yet another example, emitting the light from the second lens group includes collimating the light.

DETAILED DESCRIPTION

Overview

The technology relates to a high magnification system that includes a field corrector lens that has a high index. The field corrector lens is configured to focus light received from free space onto a sensor of a free-space optical communication system and/or an optical fiber of the free-space optical communication system.

The features of the system are configured to provide a high magnification afocal system that is able to limit the amount of diffraction, restrict aberration, and compact the overall length of the system. The high magnification achievable by the system may allow for a smaller collimated beam on the compressed end and allow for use of optics with smaller footprints and lower costs. The high magnification system may also reduce interference to an optical signal from the light in the visible light spectrum, and as a result may increase the reliability of a communication link.

Example Systems

Figure 1:
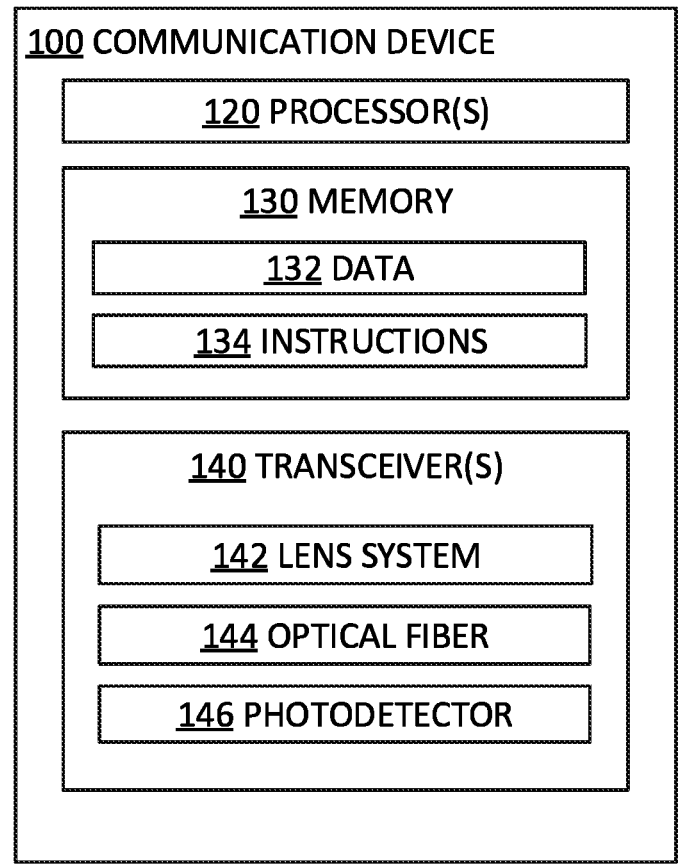
FIG. 1 is a functional diagram of a communication device in accordance with aspects of the disclosure.

FIG. 1 shows an optical communication device 100 that includes one or more processors 120, a memory 130, and one or more transceivers 140. The optical communication device 100 may be configured to form one or more communication links with other optical communication devices. The one or more processors 120 may be any conventional processors, such as commercially available CPUs. Alternatively, the one or more processors may be a dedicated device such as an application specific integrated circuit (ASIC) or other hardware-based processor, such as a field programmable gate array (FPGA). Although FIG. 1 functionally illustrates the one or more processors 120 and memory 130 as being within the same block, it will be understood that the one or more processors 120 and memory 130 may actually comprise multiple processors and memories that may or may not be stored within the same physical housing. Accordingly, references to a processor or computer will be understood to include references to a collection of processors or computers or memories that may or may not operate in parallel.

Memory 130 stores information accessible by the one or more processors 120, including data 132 and instructions 134 that may be executed by the one or more processors 120. The memory may be of any type capable of storing information accessible by the processor, including a computer-readable medium such as a hard-drive, memory card, ROM, RAM, DVD or other optical disks, as well as other write-capable and read-only memories. The system and method may include different combinations of the foregoing, whereby different portions of the instructions and data are stored on different types of media.

Data 132 may be retrieved, stored or modified by the one or more processors 120 in accordance with the instructions 134. For instance, although the system and method is not limited by any particular data structure, the data 132 may be stored in computer registers, in a relational database as a table having a plurality of different fields and records, XML documents or flat files.

Instructions 134 may be any set of instructions to be executed directly (such as machine code) or indirectly (such as scripts) by the one or more processors 120. For example, the instructions 134 may be stored as computer code on the computer-readable medium. In that regard, the terms "instructions" and "programs" may be used interchangeably herein. The instructions 134 may be stored in object code format for direct processing by the one or more processors 120, or in any other computer language including scripts or collections of independent source code modules that are interpreted on demand or compiled in advance. Functions, methods and routines of the instructions 134 are explained in more detail below.

Figure 2:
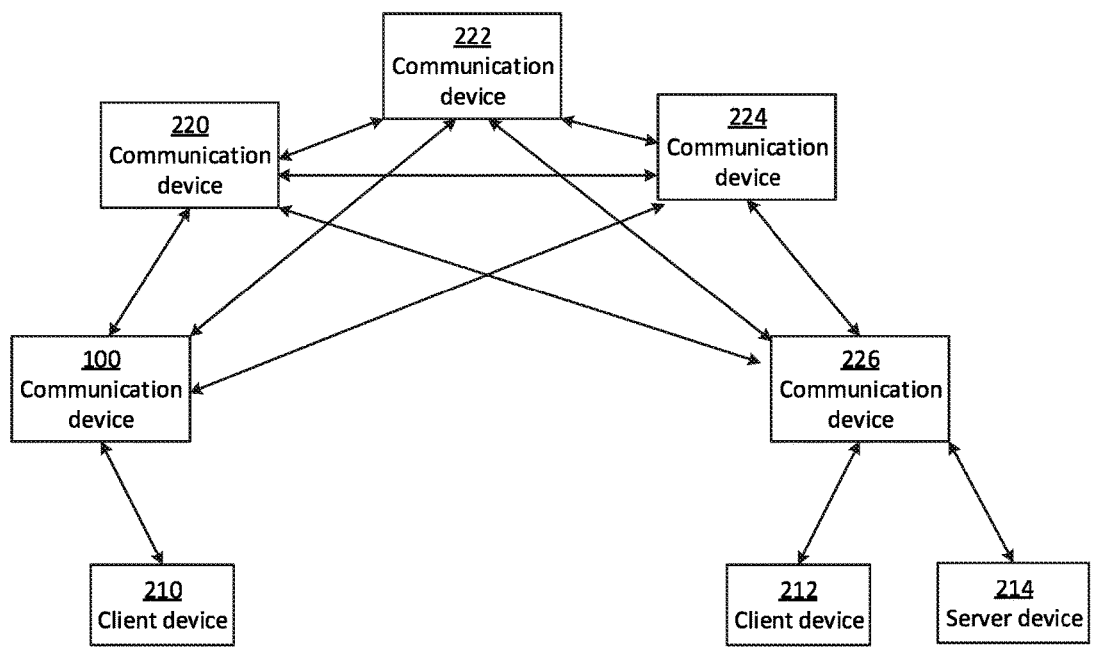
FIG. 2 is a functional diagram of a network in accordance with aspects of the disclosure.

The one or more transceivers 140 may be configured to transmit and receive optical frequencies via cable, fiber, or free space. One or more additional transceivers may also be included that are configured to transmit and receive radio frequencies or other frequencies. The one or more transceivers 140 are configured to communicate with one or more other communication devices via one or more communication links. In FIG. 2, the communication device 100 is shown having communication links (illustrated as arrows) with client device 210 and communication devices 220, 222, and 224.

With a plurality of communication devices, the communication device 100 may form a communication network, such as network 200 in FIG. 2. The network 200 includes client devices 210 and 212, server device 214, and communication devices 100, 220, 222, 224, and 226. Each of the client devices 210, 212, server device 214, and communication devices 220, 222, 224, and 226 may include one or more processors, a memory, and one or more transceivers. The one or more processors may be any well-known processor or a dedicated controller similar to the one or more processors described above. The memory may store information accessible by the one or more processors, including data and instructions that may be executed by the one or more processors. The memory, data, and instructions may be configured similarly to memory 130, data 132, and instructions 134 described above. Using the one or more transceivers, each communication device in network 200 may form at least one communication link with another communication device, as shown by the arrows. The communication links may be for optical frequencies, radio frequencies, other frequencies, or a combination of frequency bands.

Figure 3:
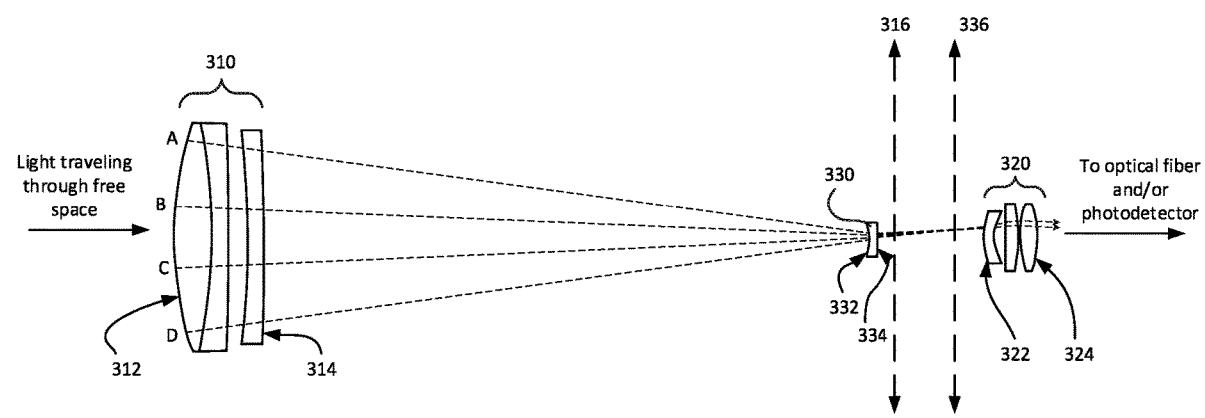
FIG. 3 is a pictorial diagram of a lens system in accordance with aspects of the disclosure.

Returning to FIG. 1, the one or more transceivers 140 of the optical communication device 100 includes a lens system 142, an optical fiber 144, and a photodetector 146. As shown in FIG. 3, the lens system 142 includes a first lens group 310, a second lens group 320, and a field corrector lens 330 positioned between the first lens group and the second lens group. The first lens group 310 includes one or more lenses and has an overall positive power. The first lens group 310 is configured to capture light from free space and begin to focus or converge the light (i.e., narrow the width of the light) until it reaches the field corrector lens 330.

The second lens group 320 is configured to receive light from the field corrector lens 330 and direct the light to the optical fiber 144 and/or the photodetector 146. In some implementations, the second lens group 320 may be configured to collimate the light received from the field corrector lens 330. The resultant light directed at the optical fiber 144 and/or the photodetector 146 is afocal due to the collimation caused by the second lens group 320.

Figure 4:
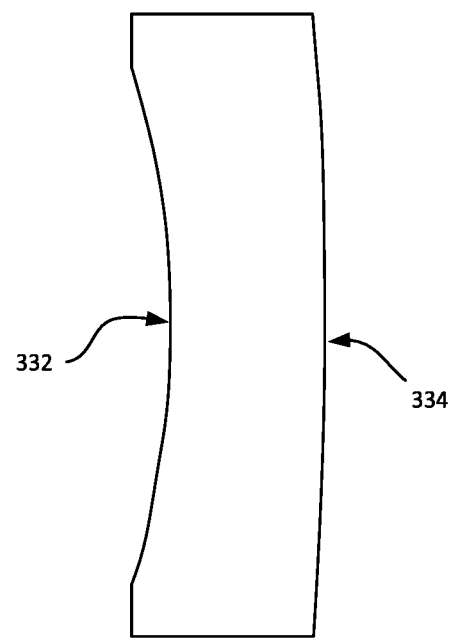
FIG. 4 is a pictorial diagram of a portion of the lens system of FIG. 3 in accordance with aspects of the disclosure.

The field corrector lens 330 has an input side positioned at or near a focal plane 316 of the first lens group 310. The focal plane is a plane representing the points at a focal length of a lens. For example, the input side of the field corrector lens 330 may be in a position between the first lens group 310 and a focal plane 316 of the first lens group. The field corrector lens 330 may be closer to the focal plane 316 than the first lens group 310. The field corrector lens 330 also has an output side pointed towards the second lens group 320. An intermediate focal plane 336 formed from the first lens group 310 and the field corrector lens 330 may be positioned between the field corrector lens 330 and the second lens group 320. In one example, the focal plane 316 may be at least approximately 245.6 mm from lens 314 of the first lens group, and the focal plane 336 may be at least approximately 38.14 mm from the focal plane 316. The field corrector lens 330 may have a negative power that reduces the converging angle of light coming from the first lens group 310 and thereby corrects a field curvature caused by the positive power of the first lens group 310. The light exiting the field corrector lens 330 still is converging. As shown in FIG. 3 and in more detail in FIG. 4, the input side 332 of the lens 330 may be concave, and the output side 334 of the lens 330 may be convex. In other implementations, other shapes for the lens 330 that have a negative optical power may be used. In some examples, the combination of the first lens group 310 and the field corrector lens 330 may reduce the cross-sectional area of the light by a factor of at least 300.

The field corrector lens 330 may be made of a material that is able to be formed into a lens and has a high index of refraction, such as at least 2.0, that is transparent for a wavelength or wavelengths of light to be received at the photodetector 146. The index of refraction of the field corrector lens 330 may be, for example, 2.7 or 2.8 (or more or less). In some implementations, the material is silicon, germanium, or zinc selenide. The manufacturing tolerance is looser when the index of a lens is high, therefore a larger radius of curvature may be achieved for the input side 332 and output side 334 with more ease and less cost than with a lens of another material that has a lower index of refraction.

In addition, the features of the material may make the material opaque or near opaque for visual light and transparent or near transparent for C-band or near-infrared wavelengths. Specifically, the material may be transparent for light having a wavelength of 1550 nm, and may act as a filter that blocks visible sunlight that would otherwise interfere with an optical signal.

Optical fiber 144 may be configured to receive light, such as an optical signal transmitted from a remote communication device and received via the lens system 142. The optical fiber 144 may also be configured to relay the light towards the photodetector 146. The photodetector 146 may be configured to detect light received at the surface of the photodetector and may convert the received light into an electrical signal using the photoelectric effect. The one or more processors 120 may be configured to use the photodetector 146 to derive data from the received light and control the optical communication device 100 in response to the derived data.

Example Operations

In operation, the lens system 142 is configured to relay light in the following manner. Light is received from a remote communication device, such as communication device 220. Referring to FIG. 3, the light travels through free space and passes from an input side 312 of the first lens group 310 to an output side 314 of the first lens group 310. The light received at the input side 312 of the first lens group 310 includes ray bundles A, B, C, and D, shown by dotted lines. The light has a first cross-sectional area at the input side 312 of the first lens group 310.

The light is then focused or converged by the first lens group 310 onto the input side 332 of the field corrector lens 330. The light has a second cross-sectional area at the input side 332 of the field corrector lens 330 that is smaller than the first cross-sectional area. As shown in FIG. 3, the ray bundles A, B, C, and D converge as they travel from the input side 312 of the first lens group 310 to the input side 332 of the field corrector lens.

The light then passes through the field corrector lens 330 before reaching the focal plane 316 of the first lens group 310. The field corrector lens 330 diverges the ray bundles A, B, C, and D from each other. The amount of divergence caused by the field corrector lens 330 reduces the convergence angle of each ray bundle A, B, C, and D. As a result, the light is focused by the field corrector lens at the intermediate focal plane 336, which is farther than the focal plane 316, and is received at an input side 322 of the second lens group 320. The light may have a third cross-sectional area at the input side of the second lens group that is smaller than the second cross-sectional area. As shown in FIG. 3, the ray bundles A, B, C, and D continue to converge as they travel from the input side 332 of the field corrector lens 330 to the intermediate focal plane 336, but do so a less steep angle or at a slower rate due to the characteristics of the field corrector lens 330. In addition, visible light frequencies are reduced or removed as the light passes through the field corrector lens 330 due to the properties of the material comprising the field corrector lens 330.

The light begins to diverge between the intermediate focal plane 336 and the second lens group 320. The light then passes through the second lens group 320, is collimated to have at least approximately parallel ray bundles, as shown in FIG. 3, and is output via an output side 324 of the second lens group 320. The collimated light is output to the optical fiber 144 and/or the photodetector 146 of the optical communication device 100. As a result, when received at the optical fiber 144 and/or the photodetector 146, the light is afocal.

The light received at the optical fiber 144 and/or the photodetector 146 may be processed by the one or more processors 120. The one or more processor 120 may then operate the optical communication device 100 according to the processed light. For example, the one or more processors 120 may extract data from the optical signal in the light. The data may include network path information, such as a next hop or a destination node, or other information related to transmission of the optical signal through a network. The one or more processors 120 may then transmit the optical signal through the network such as the network 200, according to the extracted data. Additionally or alternatively, the one or more processors 120 may track characteristics of the optical signal, such as location, orientation, signal strength, error rate, etc. According to the tracked characteristic, the one or more processors 120 may then adjust a transmitted signal over the communication link with the remote communication device. For example, the one or more processors 120 may adjust a pointing direction, a power, a bit rate, or an encoding scheme of the transmitted signal.

The features described above are configured to provide a lens system that is able to limit the amount of diffraction, restrict aberration, and compact the overall length of the lens system. The lens system described above may also reduce interference to an optical signal from the light in the visible light spectrum, and as a result may increase the reliability of a communication link.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A free-space optical communication system comprising:
    a first lens group having a positive power that is configured to receive a communication signal from a remote free-space optical transmitter, the first lens group having a first focal plane;
    a single field corrector lens having a negative power that is positioned between the first lens group and the first focal plane of the first lens group and positioned closer to the first focal plane than to the first lens group, the single field corrector lens comprising:
        (i) material having an index of refraction of at least 2.0,
        (ii) an input side that includes a concave surface, and
        (iii) an output side that includes a convex surface having a second radius of curvature,
    wherein the single field corrector lens is configured to correct a field curvature caused by the first lens group, and a combination of the first lens group and the single field corrector lens has a second focal plane that is farther from the first lens group than is the first focal plane;
    a second lens group positioned with the second focal plane between the single field corrector lens and the second lens group and configured to couple the communication signal to a sensor of the free-space optical communication system, and wherein the single field corrector lens has a smaller diameter than lenses in the first lens group and the second lens group;
    the sensor; and
    one or more processors configured to:
        extract data related to the communication signal using the sensor; and
        adjust at least one of pointing direction, power, bit rate, or encoding scheme of the system according to the extracted data.

2. The system of claim 1, wherein the index of refraction is at least 2.7.

3. The system of claim 1, wherein the material is silicon.

4. The system of claim 1, wherein the single field corrector lens is configured to reduce a cross-sectional area of light carrying the communication signal received at the first lens group.

5. The system of claim 4, wherein the single field corrector lens is configured to reduce the cross-sectional area of the light received at the first lens group by at least a factor of 300 at the second focal plane.

6. The system of claim 1, wherein the material is opaque for visual light.

7. The system of claim 1, wherein the material is transparent for C-band or near-infrared wavelengths.

8. The system of claim 1, wherein
    the extracted data includes network path information for an optical signal; and
    the one or more processors are configured to operate the free-space optical communication according to the extracted data by transmitting the optical signal to a network based on the extracted data.

9. The system of claim 1, wherein:
    the extracted data includes characteristics for an optical signal; and
    the one or more processors are configured to operate the free-space optical communication system according to the extracted data by adjusting a transmitted signal over a communication link with a remote communication device associated with the remote free-space optical transmitter.

10. A method of processing an optical signal, the method including:
    receiving light carrying a communication signal at a first lens group of an optical communication device;
    the first lens group focusing the light onto a single field corrector lens of the optical communication device, the single field corrector lens being positioned between the first lens group and a first focal plane of the first lens group and positioned closer to the first focal plane than the first lens group, wherein a combination of the first lens group and the single field corrector lens has a second focal plane farther from the first lens group than the first focal plane;
    receiving the light at the single field corrector lens that comprises material having an index of refraction greater than 2.0;
    the single field corrector lens filtering and diverging the light received thereat, resulting in a correction to a field curvature caused by the first lens group;
    focusing the light, using the single field corrector lens, onto a second lens group of the optical communication device, the second lens group being positioned with the second focal plane between the single field corrector lens and the second lens group, and the single field corrector lens has a smaller diameter than lenses in the first lens group and the second lens group;
    emitting the light from the second lens group to a photodetector of the optical communication device; and
    operating, by one or more processors, the optical communication device according to the communication signal carried by the light received at the photodetector, wherein operating the optical communication device comprises adjusting at least one of pointing direction, power, bit rate, or encoding scheme of the device according to extracted data that is related to the communication signal.

11. The method of claim 10, wherein the single field corrector lens is made of silicon.

12. The method of claim 10, wherein filtering the light includes removing or reducing visible light frequencies.

13. The method of claim 10, wherein focusing the light using the single field corrector lens includes reducing a cross-sectional area of the light received at the first lens group by a factor of at least 300 at the second focal plane.

14. The method of claim 10, wherein emitting the light from the second lens group includes collimating the light.

* * * * *

UNITED STATES PATENT AND TRADEMARK OFFICE
CERTIFICATE OF CORRECTION

| | | |
|---|---|---|
| PATENT NO. | : 11,777,603 B2 | Page 1 of 1 |
| APPLICATION NO. | : 16/436278 | |
| DATED | : October 3, 2023 | |
| INVENTOR(S) | : Nam-hyong Kim, Andrei Kazmierski and Devin Brinkley | |

It is certified that error appears in the above-identified patent and that said Letters Patent is hereby corrected as shown below:

In the Claims

Claim 10, Column 8, Line 45:
Now reads: "the device"; should read -- the optical communications device --

Signed and Sealed this
Twenty-third Day of January, 2024

Katherine Kelly Vidal
*Director of the United States Patent and Trademark Office*